United States Patent [19]

Dubler

[11] Patent Number: 4,562,762
[45] Date of Patent: Jan. 7, 1986

[54] LOW KICK SAW CHAIN

[75] Inventor: Richard D. Dubler, Charlotte, N.C.

[73] Assignee: Textron Inc., Providence, R.I.

[21] Appl. No.: 454,097

[22] Filed: Dec. 28, 1982

[51] Int. Cl.$^4$ ............................................. B27B 33/14
[52] U.S. Cl. ......................................... 83/834; 83/833
[58] Field of Search ................ 83/830, 831, 832, 833, 83/834; 144/72, 73

[56] References Cited

U.S. PATENT DOCUMENTS

| | | | |
|---|---|---|---|
| 2,872,956 | 2/1959 | Gudmundsen | 83/833 |
| 2,923,329 | 2/1960 | Gudmundsen | 83/834 |
| 3,329,183 | 7/1967 | Robinson | 83/834 |
| 3,910,148 | 10/1975 | Weiss | 83/833 |
| 4,074,604 | 2/1978 | Goldblatt et al. | 83/834 |
| 4,133,239 | 1/1979 | Goldblatt | 83/834 |
| 4,348,927 | 9/1982 | Olmr | 83/833 |
| 4,353,277 | 10/1982 | Silvon | 83/833 |

FOREIGN PATENT DOCUMENTS

| | | | |
|---|---|---|---|
| 1332584 | 6/1963 | France | 83/834 |
| 44099 | 2/1961 | Poland | 83/834 |

Primary Examiner—Frank T. Yost
Assistant Examiner—Hien H. Phan
Attorney, Agent, or Firm—Cushman, Darby & Cushman

[57] ABSTRACT

A saw chain includes a non-cutting guard link having a base with rivet-receiving openings, and a top portion with a nose extending rearward of the base portion. The nose is formed by coining, rolling, or bending, such as in a progressive die system, so that the width of the nose is approximately equal to the width of the base portion of the guard link plus the width of a center link to which the guard link is pivotally connected. Right-hand and left-hand cutter links follow, respectively, left-hand and right-hand guard links, the guard links cooperating with the cutter link depth gauges to present a facial area approximately equal to the chain width to thereby minimize kick-back.

17 Claims, 6 Drawing Figures

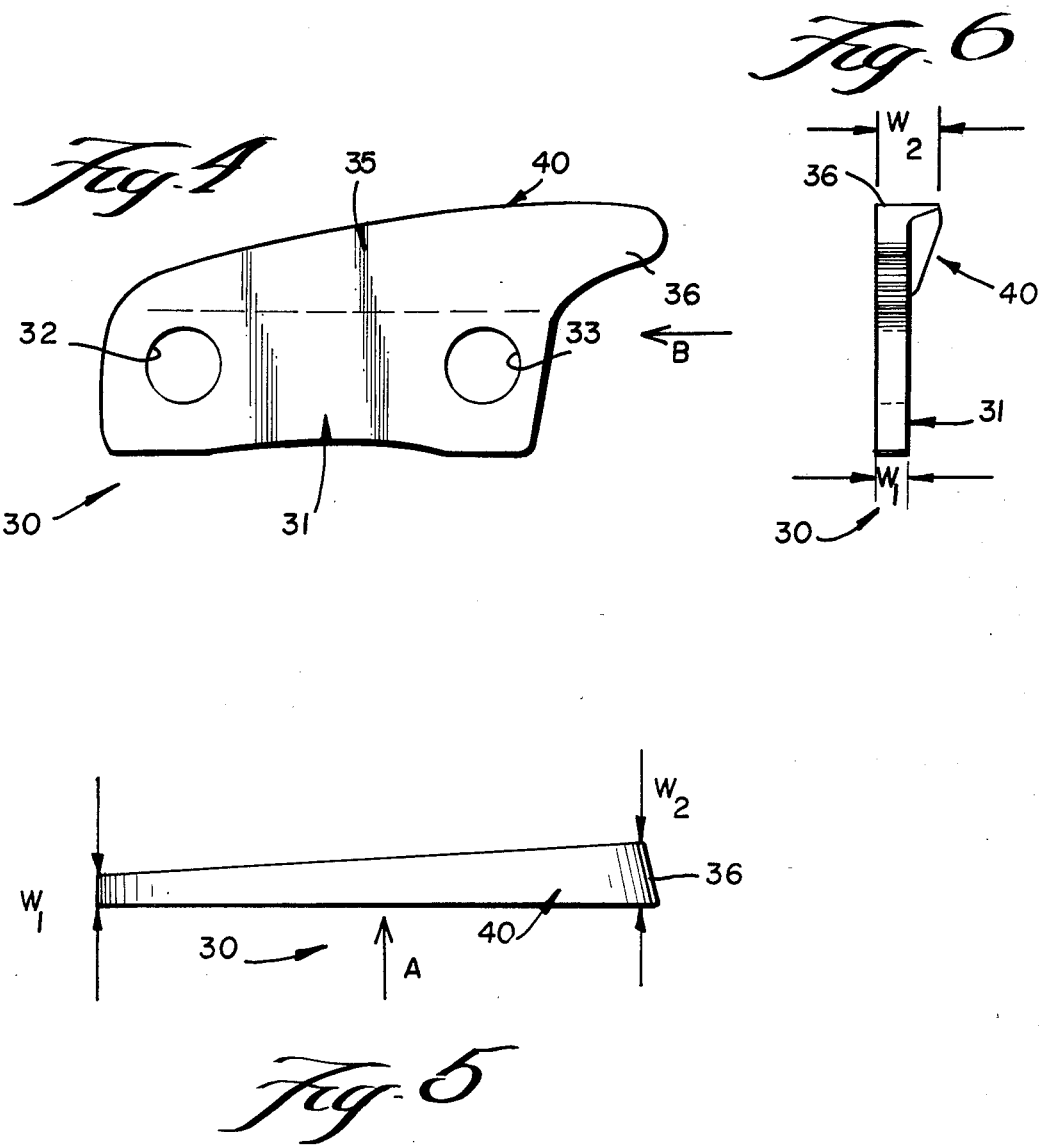

LOW KICK SAW CHAIN

BACKGROUND AND SUMMARY OF THE INVENTION

The invention relates to a saw chain for chain saws, and to a particular tie link for such a chain.

An optimally designed saw chain is one that has good wear characteristics, minimal kick-back, and good cutting action. The chain according to the present invention is constructed with these optimal results in mind.

The chain according to the invention presents a general facial area as the chain is traversing the nose of a guide bar (where kick-back can occur) that is substantially as wide as the chain itself, minimizing the possibility that the cutter will become buried in the wood being cut. This wide facial area is provided by constructing a specially configured tie link (i.e. a guard link) that is disposed on the opposite side of the chain from a following cutter link. All other components of the chain may be conventional components, resulting in ease of manufacturing procedures. The guard link does not significantly interfere with the cutting action of the cutter link, and is positioned with respect to the cutter link so that there is good chip clearance and so that any tendency of the chain to "skate", when brought into contact with a smooth cutting surface, is minimized.

A tie link (i.e. guard link) according to the present invention comprises a non-cutting link having a base portion including front and rear rivet receiving openings, and a top portion extending above the base portion. The top portion terminates in a nose portion which is rearward of the entire rear rivet receiving opening (and preferably rearward of the entire base portion of the link), and the center of gravity of the link is located closer to the rear rivet receiving opening than the front rivet receiving opening. The nose has a width substantially greater (e.g. twice as great) as the width of the base portion of the guard link, so as to present a large facial area as the chain of which the link is a part traverses the nose of a guide bar.

A saw chain according to the present invention comprises a series of center drive links, and pairs of side links all pivotally joined to the center links to form an articulated chain.

A first pair of side links comprises a non-cutting tie link to one side of the chain, and a cutter link on the opposite side of the chain from the non-cutting tie link. The cutter link has a base portion including front and rear rivet receiving openings, and a top portion above the base portion and including an upstanding depth gauge at the front of the link, and a cutter tooth rearward of the depth gauge.

The chain further comprises a second pair of side links immediately preceding each cutter link, and comprising a non-cutting tie link on the same side of the chain as the following cutter link, and a non-cutting guard link on the opposite side of the chain from the following cutter link, the guard link being as previously described. The nose portion of the guard link terminates adjacent the depth gauge of the following cutter link, and preferably has a width substantially equal to the width of the guard link base portion plus the width of a center link. When the chain is straight the nose portion of the guard link preferably has a height less than the maximum height of the depth gauge, but the nose of the guard link is constructed so that as the chain goes around the nose of a guide bar (where kick-back can occur) the nose of the guard link is even with, or slightly higher than, the depth gauge. The distance that the nose extends rearwardly of the rear rivet-receiving opening, or base portion, of the guard link, and its position vis-a-vis the following cutter link depth gauge, is dependent upon the particular size (e.g. pitch) of the chain, the configuration of the cutter, particular cutting conditions, and the like. For instance the nose portion of the guard link can be configured so that one can, or cannot, see light between it and the depth gauge of the following cutter link when the chain is straight and viewed from the side, or when the chain is traversing the nose of a guide bar and viewed from the side.

The guard link according to the present invention preferably is constructed from a blank (cut to a predetermined configuration) which is passed through a progressive die system so that the top portion of the link is gradually bent over. That is, the guard link according to the present invention is preferably formed in a manner similar to the manner in which the cutter teeth of cutter links are conventionally formed, except, of course, that there will be no sharpening of any surfaces thereof, and the maximum width of the nose of the link preferably is only about two-thirds the width of the chain.

It is the primary object of the present invention to provide a saw chain, and particular non-cutting tie link therefor, which can minimize kick-back without adversely affecting cutting capabilities of the chain. This and other objects of the invention will become clear from an inspection of the detailed description of the invention, and from the appended claims.

BRIEF DESCRIPTION OF THE DRAWINGS

FIG. 4 is a side view, viewed in the direction of the arrow A in FIG. 5, of an exemplary guard link according to the present invention;

FIG. 5 is a top view of the guard link of FIG. 4; and

FIG. 6 is a rear view, looking in the direction of arrow B of FIG. 4, of the link of FIG. 4.

DETAILED DESCRIPTION OF THE DRAWINGS

Figure 1:
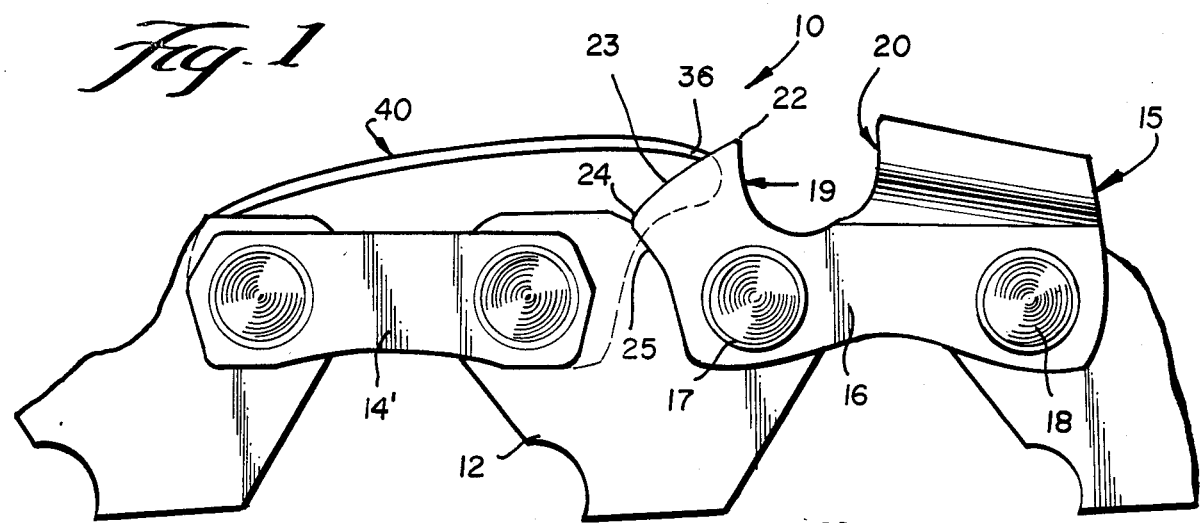
FIG. 1 is a side view of an exemplary saw chain according to the present invention, when the chain is straight.
Figure 2:
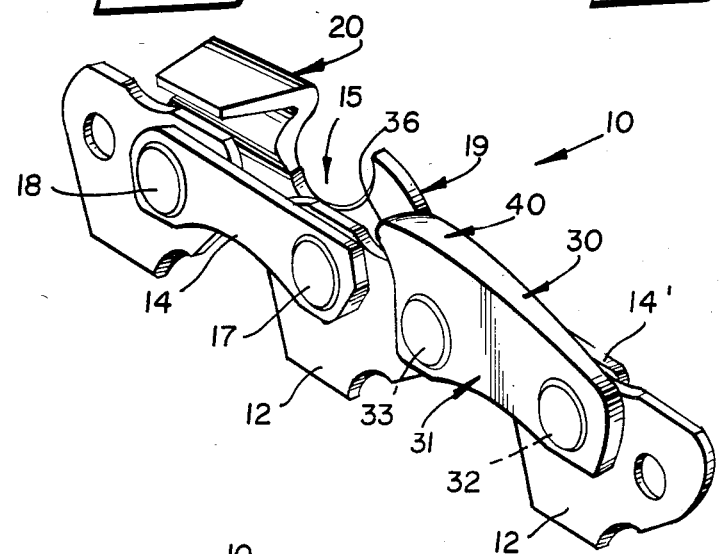
FIG. 2 is a perspective view of the chain of FIG. 1, viewed from the opposite side thereof.
Figure 3:
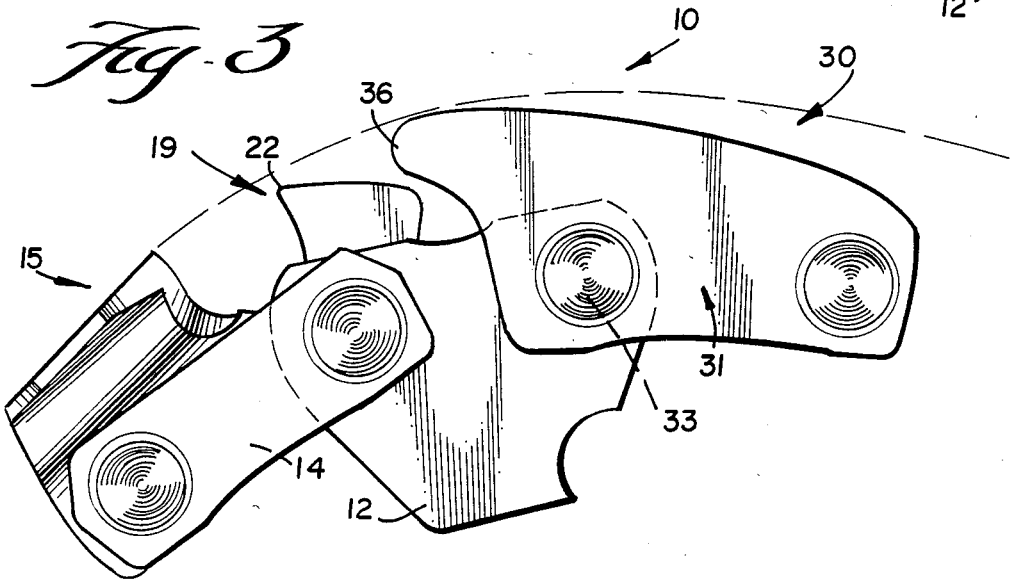
FIG. 3 is a side view of the chain of FIG. 2 as it traverses the nose of the guide bar.

An exemplary saw chain according to the present invention is shown generally by reference numeral 10 in FIGS. 1 through 3. The chain includes a series of conventional center drive links 12, and pairs of side links all pivotally joined to the center links 12 by rivets to form an articulated chain.

A first pair of side links of the chain 10 comprises a non-cutting tie link 14 on one side of the chain, and a cutter link 15 pivotally connected to a center drive link 12 on the opposite side thereof from the tie link 14. The cutter link 15 includes a base portion 16 having front and rear rivet receiving openings for receiving front and rear rivets 17, 18 respectively, and having an upstanding depth gauge 19 at the front of the link, and a cutter tooth 20 rearward of the depth gauge, with a gullet therebetween. Alternating cutter links 15 comprise right and left hand cutter teeth 20.

The invention is not in any way restricted to the type of cutter link 15 utilized, and any conventional cutter link may be utilized. One particularly advantageous conventional cutter link 15 is illustrated in the drawings, and includes a depth gauge 19 having a peak portion 22 of maximum height, the peak portion 22 being located forwardly of the center of the front rivet receiving opening (receiving rivet 17) of the base portion 16, and having a surface 23 sloping gradually downwardly from the peak portion 22 from a front-most portion 24. The front-most portion 24 is disposed forwardly of the base portion 16 of the cutter link 15, and a surface 25 is curved backwardly toward the base portion 16.

The chain according to the present invention further comprises a second pair of side links immediately preceding each cutter link and comprising a non-cutting tie link 14' (substantially identical to the link 14) on the same side of the chain as the following cutter link 15, and a non-cutting guard link 30 (see all of FIGS. 1 through 6) on the opposite side of the chain as the tie link 14', and as the following cutter link 15.

The guard link 30 according to the present invention has a base portion 31 of the same width $W_1$ as the tie links 14, 14' and the base portion 16 of the cutter link, which may also be the same as the width of the center drive links 12. The base portion has front and rear rivet receiving openings 32, 33 respectively. A top portion 35 extends above the base portion 31. The top portion 35 terminates in a nose portion 36 which is adjacent the depth gauge 19 (see FIGS. 1 through 3) of the following cutter link 15, the nose 36 being rearward of the entire rear rivet receiving opening 33, and preferably rearward of the entire base portion 31. The nose 36 has a width $W_2$ (see FIGS. 2, 5, and 6) which is preferably equal to the width $W_1$ of the base portion 31 plus the width of a center drive link 12 (e.g. $W_2 = 2W_1$). Preferably the guard link top portion 35 has a generally upwardly and rearwardly sloping surface 40, the surface 40 terminating in the nose 36, and the surface 40 may have a gradually increasing width from a front portion of the guard link to the nose (see FIGS. 2, 5, and 6). Alternatively, the width of surface 40 may increase in steps, or may be constant along its length. The center of gravity of link 30 is closer to the rear rivet opening 33 than the front rivet opening 32.

The guard link 30 preferably is formed by acting upon a blank (cut to a predetermined configuration) in a progressive die system so that the surface 40 is gradually formed by coining, rolling, or bending. Thus the guard links 30 are preferably formed in basically the same manner as the cutting teeth 20 of cutter links 15, except that there will be no sharpened surfaces of the guard link 30, and the maximum width $W_2$ thereof is preferably about ⅔ the width of the chain 10. Alternating guard links 30 will be left-hand and right-hand guard links. A right-hand guard link—which precedes a left-hand cutter—is shown in FIGS. 1 through 3, while a left-hand guard link—which would precede a right-hand cutter—is illustrated in FIGS. 4 through 6.

The exact configuration of the entire top portion 35, including nose 36 and surface 40, of the guard link 30, may be varied a great deal depending upon the size (e.g. pitch) and configuration of the other links of the chain 10, the particular cutting conditions the chain is likely to experience, the degree of kick-back protection desired, etcetera. For instance while the general upward and rearward slope of the surface 40 is illustrated in the drawings as fairly steep it may be relatively flat, such as shown for the guard link in U.S. Pat. No. 4,353,277. Further, while for the exemplary embodiment illustrated in the drawing the nose 36 is constructed vis-a-vis the depth gauge 19 so that when the chain 10 is viewed from the side while the chain is straight (FIG. 1) one cannot see light between the nose 36 and depth gauge 19, the relative configurations of the depth gauge 19 and nose 36 may be varied so that one can see light. Additionally, while in the embodiment illustrated in the drawing when the chain is viewed from the side while it is traversing the nose of a typically dimensioned guide bar with which it is adapted to be used, one can see light between the nose 36 and the depth gauge 19, the relative constructions of the nose 36 and depth gauge 19 can be such so that one cannot see light therebetween. The exact positioning of the rearward most extent of the nose 36 vis-a-vis the rivet receiving opening 33, the exact manner of width increase of the surface 40, the exact magnitude of the width $W_2$, etcetera, are further variables that may be modified within the scope of the invention, as long as the desired objectives are received.

In the one exemplary preferred form of the chain 10 illustrated in the drawings, the maximum height of the nose 36 is less than the height of the depth gauge peak 22 when the chain is straight (see FIG. 1), but as the chain 10 traverses the nose of a guide bar (FIG. 3) the topmost portion of the nose 36 is at substantially the same height, or slightly higher than the peak 22, and it is in this position that a large facial area (by surface 40 and depth gauge 19) is presented to minimize the possibility that the cutter 15 will be buried in the wood being cut.

Thus, it will be seen that according to the present invention a saw chain, and a guard link for use with a saw chain, have been provided which minimize kickback while not significantly affecting the cutting action of the chain. While the invention has been herein shown and described in what is presently conceived to be the most practical and preferred embodiment thereof, it will apparent to those of ordinary skill in the art that many modifications may be made thereof within the scope of the invention, which scope is to be accorded the broadest interpretation of the appended claims so as to encompass all equivalent structures and devices.

What is claimed is:

1. A low kick saw chain comprising:
 a series of center drive links, and pairs of side links all pivotally joined to said center links to form an articulated chain;
 a first pair of side links comprising: a non-cutting tie link on one side of the chain; and a cutter link bearing an upstanding depth gauge at the front of the link and a cutter tooth rearward of the depth gauge, the cutter link on the opposite side of the chain from the non-cutting tie link; and
 a second pair of side links immediately preceding each cutter link and comprising: a non-cutting tie link on the same side of the chain as the following cutter link; and a non-cutting guard link on the opposite side of the chain from the following cutter link;
 said guard link having a base portion including front and rear rivet receiving openings, and a top portion extending above said base portion, terminating in a nose portion adjacent the depth gauge of the following cutter link, said nose being rearward of the entire rear rivet receiving opening of said guard link, and said nose having a width substantially equal to the width of said guard link base portion plus the width of a center link, to provide a facial area that minimizes the possibility the cutter will be buried in wood being cut.

2. A saw chain as recited in claim 1 wherein said guard link top portion has a generally upwardly and rearwardly sloping surface, said surface terminating in said nose and having a generally gradually increasing width from a front portion of said guard link to said nose.

3. A saw as recited in claim 2 wherein when the chain is straight said nose of said guard link has a height less than the maximum height of said depth gauge.

4. A saw guard link as recited in claim 3 wherein said nose of said guard link is rearward of the base portion of said guard link.

5. A saw chain as recited in claim 4 wherein when the chain is traversing the nose of a guide bar said guard link nose has a height substantially equal to the maximum height of said depth gauge.

6. A saw chain as recited in claim 1 wherein when the chain is straight said nose of said guard link has a height less than the maximum height of said depth gauge.

7. A saw chain as recited in claim 6 wherein when the chain is traversing the nose of a guide bar said guard link nose has a height substantially equal to the maximum height of said depth gauge.

8. A guard link as recited in claim 6 wherein said nose of said guard link is rearward of the base portion of said guard link.

9. A saw chain as recited in claim 1 wherein said cutter link includes: a base portion including front and rear rivet receiving openings; and a top portion above said base portion and including said depth gauge and cutter tooth; and wherein said depth gauge includes a peak portion of maximum height, said peak portion being located forwardly of the center of the front rivet opening of said cutter link base portion, and sloping gradually downwardly from said peak portion to a front-most portion, said front-most portion being disposed forwardly of said base portion of said cutter link, and curved backwardly toward said base portion of said cutter link.

10. A saw chain as recited in claim 1 wherein, when the chain is straight and viewed from the side, one cannot see light between said depth gauge and said guard link nose.

11. A saw chain as recited in claim 1 wherein the center of gravity of said guard link is located closer to the rear rivet receiving opening than the front rivet receiving opening.

12. A saw chain as recited in claim 1 wherein, when the chain is traversing the nose of a guide bar and viewed from the side, one can see light between said depth gauge and said guard link nose.

13. A saw chain as recited in claim 1 wherein when the chain is traversing the nose of a guide bar said guard link nose has a height substantially equal to the maximum height of said depth gauge.

14. A guard link as recited in claim 1 wherein said nose of said guard link is rearward of the base portion of said guard link.

15. A saw chain as recited in claim 1 wherein alternating cutter links are right-hand and left-hand cutter links, and wherein alternating guard links are left-hand and right-hand guard links, respectively.

16. A plurality of right-hand non-cutting tie links, and a plurality of left-hand non-cutting tie links of a low kick saw chain for a chain saw; said non-cutting tie links adapted to be connected by rivets to saw chain cutter links and drive links, each of said non-cutting tie links having: a base portion including front and rear rivet receiving openings, and a top portion extending above said base portion, said top portion terminating in a nose portion rearward of the entire rear rivet receiving opening, said nose portion having a width significantly greater than the width of said base portion, and said nose portion formed by passing a blank through a progressive die system to coin, roll, or bend over portions of said blank to form either a right-hand, or a left-hand, non-cutting tie link.

17. A plurality of non-cutting tie links as recited in claim 16, wherein for each tie link said top portion has a generally upwardly and rearwardly sloping surface, said surface terminating in said nose portion and having a gradually increasing width from a front portion of said link to said nose portion.

* * * * *